United States Patent
Dembowsky et al.

(10) Patent No.: US 7,241,097 B2
(45) Date of Patent: Jul. 10, 2007

(54) THREADED JOINING ASSEMBLY WITH TOLERANCES COMPENSATING MEANS

(75) Inventors: Hans-Joachim Dembowsky, Hamburg (DE); Martin Jodeleit, Bielefeld (DE); Hans-Ulrich Figge, Schloss Holte-Stukenbrock (DE)

(73) Assignee: Bollhoff Verbindungstechnik GmbH, Bielefeld (DE)

( * ) Notice: Subject to any disclaimer, the term of this patent is extended or adjusted under 35 U.S.C. 154(b) by 0 days.

(21) Appl. No.: 11/301,293

(22) Filed: Dec. 8, 2005

(65) Prior Publication Data

US 2006/0127169 A1 Jun. 15, 2006

(30) Foreign Application Priority Data

Dec. 10, 2004 (DE) .................. 20 2004 019 153 U

(51) Int. Cl.
*F16B 33/00* (2006.01)

(52) U.S. Cl. .................. 411/369; 411/34; 411/546; 411/389

(58) Field of Classification Search .................. 411/546, 411/34, 369, 389, 37, 38, 542
See application file for complete search history.

(56) References Cited

U.S. PATENT DOCUMENTS

| | | | |
|---|---|---|---|
| 4,690,365 A * | 9/1987 | Miller et al. ................. | 248/650 |
| 4,984,946 A * | 1/1991 | Phillips, II .................... | 411/34 |
| 5,333,978 A * | 8/1994 | Rives .......................... | 411/389 |
| 5,492,388 A * | 2/1996 | Kawasaki ............... | 296/193.02 |
| 6,062,263 A | 5/2000 | Donovan et al. | |
| 6,131,346 A * | 10/2000 | Kordes ......................... | 52/235 |
| 6,763,746 B2 * | 7/2004 | Bayer et al. .................. | 81/484 |
| 6,776,566 B2 * | 8/2004 | Kobusch et al. ............ | 411/546 |
| 6,817,817 B2 * | 11/2004 | Dembowsky et al. ........ | 411/369 |

FOREIGN PATENT DOCUMENTS

| | | |
|---|---|---|
| DE | 19542109 A1 | 5/1996 |
| DE | 19612479 A1 | 12/1997 |
| DE | 19818791 A1 | 10/1999 |
| DE | 202 04 994 U 1 | 8/2002 |
| DE | 202004012733 U1 | 11/2004 |

* cited by examiner

Primary Examiner—Flemming Saether
(74) Attorney, Agent, or Firm—Seyfarth Shaw LLP

(57) ABSTRACT

A threaded joining assembly for joining a first member and a second member that includes a nut having a sleeve-shaped body adapted to be fixed within a hole of the first member. The sleeve-shaped body has a threaded bore portion and a smooth bore portion. The bolt comprises first threads threadingly engaging the treaded bore portion of the nut, a fastening portion connected to the second member, and a sealing portion. The sealing portion comprises at least one sealing rib that engages the smooth bore portion of the nut in a sealed, self-locking relationship. The fastening portion comprises a flange engaging the second member and second threads threadingly engaging a lock-nut such that the position of the second member with respect to the first member may be fine adjusted by the bolt and fixed by clamping the second member between the flange of the bolt and the locknut.

16 Claims, 2 Drawing Sheets

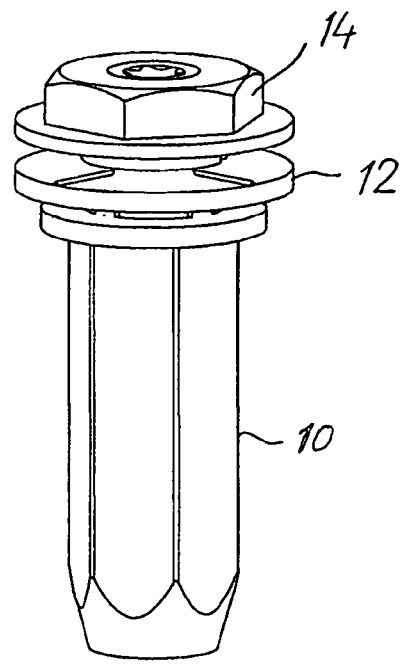
Fig. 1
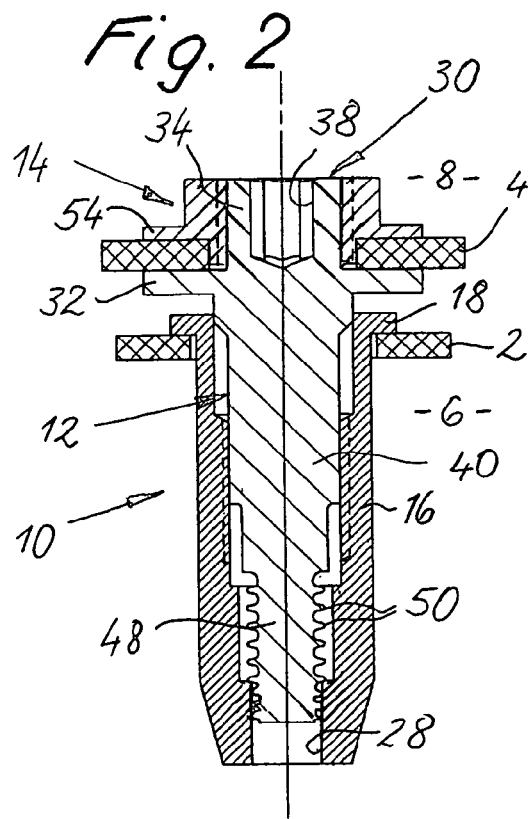
Fig. 2
Fig. 3

THREADED JOINING ASSEMBLY WITH TOLERANCES COMPENSATING MEANS

BACKGROUND OF THE INVENTION

The present invention relates to a threaded joining assembly for joining a first member and a second member and enabling compensation of tolerances of a spacing between the second member and other parts.

German patent application DE 101 47 141 A1 discloses a sealed, adjustable, and self-locking threaded joining assembly comprising a nut and a bolt. In this threaded joining assembly, the nut, which is e.g. a blind rivet nut and is fixed to the first member, includes a bore comprising a threaded bore portion and a cylindrical smooth bore portion. The bolt, which may be releasably connected to the second member via a coupling part, has an intermediate portion provided with a plurality of circumferentially extending sealing ribs. The sealing ribs are dimensioned with respect to the cylindrical smooth bore portion of the nut such that they are slidingly urged against the smooth bore portion of the bore when the bolt is adjusted relative to the nut. This results in a threaded joining assembly which is fluid-tight and self-locking even though it is adjustable.

Such a threaded joining assembly may be used to fasten a vehicle backlight at a vehicle body sheet. Generally there is a gap between the vehicle backlight and other vehicle body parts, which gap should be minimized in particular for esthetical reasons. The threaded joining assembly being adjustable allows to change the spacing between the two members so as to minimize the gap.

SUMMARY OF THE INVENTION

An object of the present invention is to improve this threaded joining assembly. In particular the threaded joining assembly is to be designed such that the second member may be fixedly connected to the nut and therefore to the second member.

According to the present invention the threaded joining assembly is characterized by a fastening portion of said bolt which comprises a flange engaging said second member and second threads threadingly engaging a locknut such that the position of said second member with respect to said first member may be fine-adjusted by said bolt and may be fixed by clamping said second member between said flange of said bolt and said lock nut.

The invention enables the second member when its position has been fine-adjusted relative to the first member to be threadingly connected to the nut and thereby to be fixedly connected to the first member. If the second member is e.g. a holding section provided at a vehicle backlight, its spacing to the first member (vehicle body sheet) may be changed by adjusting the threaded joining assembly in order to compensate for manufacturing and assembling tolerances of the spacing.

Preferably the sealing portion of the bolt is not formed as an intermediate portion but provided on an axial end of the bolt. As a result the sealing portion of the bolt may be readily provided with more than three sealing ribs in order to improve the self-locking and sealing properties of the threaded joining assembly.

BRIEF DESCRIPTION OF THE DRAWINGS

A preferred embodiment of the present invention will be explained in more detail with reference to the accompanying drawings wherein:

FIG. 1 is a perspective view of a threaded joining assembly without any members to be joined;

FIGS. 2 and 3 are longitudinal sections of the threaded joining assembly in FIG. 1 with the members to be joined in different operative conditions;

DETAILED DESCRIPTION OF THE DRAWINGS

Figure 4:
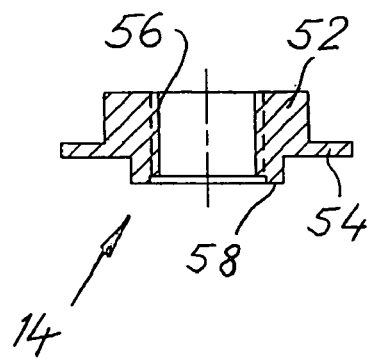
FIG. 4 is a longitudinal section through a lock nut of the threaded joining assembly of FIGS. 1 to 3.

The threaded joining assembly shown in FIGS. 1 to 3 is arranged to join a member 2 and a member 4 both of which are plate-shaped at least in the area of the threaded joining assembly. The member 2 is e.g. a body sheet of a vehicle (not shown), and the member 4 is e.g. a plastic holding section integrally formed with a backlight (not shown) of the vehicle. As already explained above, generally there is a gap (not shown) between the backlight and other vehicle parts, which gap is to be minimized by adjusting the threaded joining assembly as will be explained in more detail below. The member 2 (body sheet) separates an internal space 6 from an external space 8 as schematically indicated in FIG. 2. The threaded joining assembly is accessable only from the external space 8.

The threaded joining assembly consists of a nut 10, a bolt 12, and a locknut 14.

Figure 6:
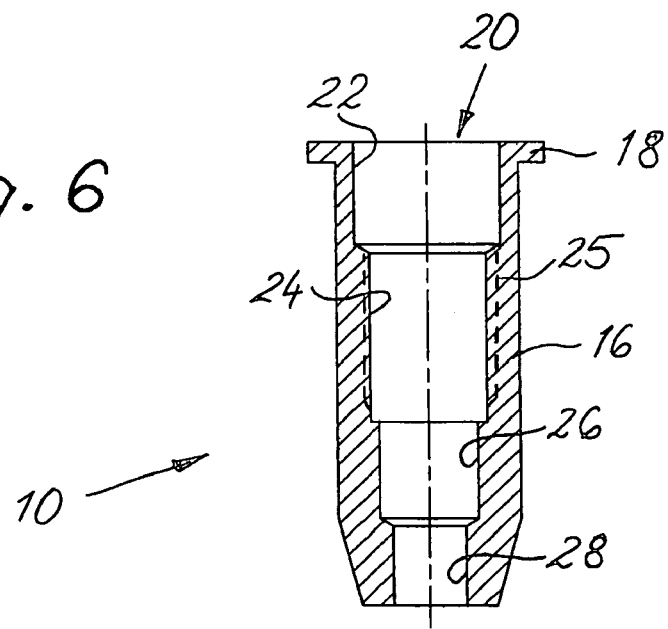
FIG. 6 is a longitudinal section of the nut of the threaded joining assembly.

The nut 10 is a blind rivet nut. As shown in particular in FIG. 6, the nut 10 comprises a sleeve-shaped body 16 having an axial end integrable with an annular projection 18. The sleeve-shaped body 16 has a through-bore 20 which is open at both ends. As shown, the bore 20, before the nut is assembled, has a smooth bore portion 22, a threaded portion 24 including threads 25, a smooth bore portion 26 and a smooth bore portion 28. The diameters of the bore portions increase from bore portion 22 via bore portions 24 and 26 to the bore portion 28. The nut 10 has a non-circular periphery, for example a hexagonal periphery (FIG. 1) to be engaged by a tool (not shown).

Figure 5:
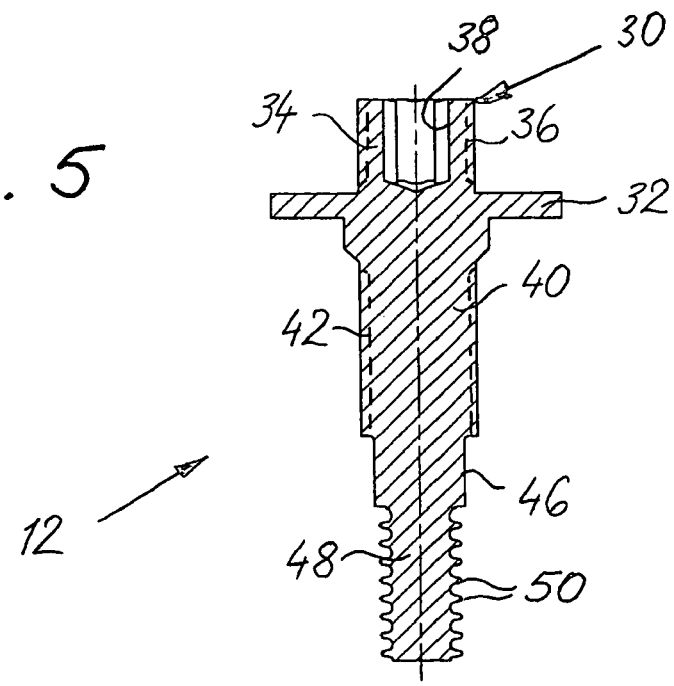
FIG. 5 is a longitudinal section of the bolt of the threaded joining assembly.

The bolt 12 shown in FIG. 5 has an axial end provided with a fastening portion 30 which comprises an annular flange 32 and a head portion 34. The head portion 34 has threads 36 and a drive formation 38 comprising a hexagonal rounded recess for engagement by a tool (not shown). On the side of the flange 32 which is remote from the head portion, the bolt has a threaded portion 40 with threads 42 which are matingly shaped with respect to the threads 25 of the nut 10.

The threaded portion 40 of the bolt 12 is followed by a smooth stem portion 46 which is followed by a sealing portion 48. The sealing portion 48 is provided at the axial end of the bolt 12 opposite to the head portion 34, and is provided with a plurality of circumferential sealing ribs 50. In the embodiment as shown there are provided eight sealing ribs 50; it should be understood, however, that more or less sealing ribs may be provided depending on the specific application. The sealing ribs 50 cooperate with the smooth bore portion 28 of the nut 20 for sealing the threading joining assembly as will be explained in more detail below.

The locknut 14 shown in FIG. 4 comprises an annular body 52 integral with an annular flange 54. The body 52 is provided with internal threads 56 matingly shaped with respect to the external threads 36 of the head portion 34 of the bolt 12. An annular projection 58 extends from the bottom of the flange 54. The body 52 of the lock nut 14 has a non-circular periphery, e.g. a hexagonal periphery (FIG. 1) for being engaged by a tool (not shown).

The bolt 12 is preferably made of an impact resistant plastic material such as a fiber reinforced polyamide, in particular a glass fiber reinforced polyamide. The nut 10 which is formed as a blind rivet nut is preferably made of a metallic material or a heard plastic material. The lock nut 14 is preferably made also of a plastic material which may be identical to the plastic material of the bolt 12.

Assembly and operation of the threaded joining assembly will now be described.

To assemble the threaded joining assembly, initially the nut 10 is inserted into a respective hole of the member 2 from above. The hole of the member 2 is matingly shaped with respect to the non-circular periphery (polygonal periphery) of the nut 10 for preventing relative rotation of the nut 10 (FIGS. 1, 2). The nut 10 will then be "set" at the member 2 by a conventional setting tool (not shown). As a result the threaded bore portion 24 of bore 20 of the nut 10 will be folded so as to form a bead 23 which cooperates with the annular projection 18 to fasten the blind rivet nut 10 at the member 2 (FIG. 3).

The bolt 12 is now inserted into the bore 20 of the nut 10, and the threads 42 of the bolt 12 will be threaded into the threads 25 of the nut 10 by a tool (not shown) engaging the drive formation 38. As a result the sealing ribs 50 enter into the cylindrical smooth bore portion 28 of the nut 10. The sealing ribs 50 are overdimensioned with respect to the diameter of the bore portion 28 such that they are urged against the wall of the bore portion 28 by a certain pressure so as to be slightly deformed, i.e. deflected. The dimensions of the sealing ribs 30 are chosen such that despite of the unavoidable manufacturing tolerances a sufficient pressure is generated in order to provide on the one hand for proper sealing of the threaded joining assembly and on the other hand for a certain self-locking effect between the bolt and the nut.

Threading the bolt 12 into the nut 10 will move the bolt 12 into a predetermined axial position relative to the member 2 (body sheet). The member 4 (holding section of the backlight) will now be moved over the head portion 34 of the bolt 12 so as to be brought into engagement with the flange 32 of the bolt 12. Initially the member 4 is supported so as to be axially displaceable. This allows to fine-adjust the position of the member 4 in contact with the flange 32 by adjusting the bolt 12 so as to minimize a gap (not shown) between the backlight and other vehicle body parts.

When the axial position of the member 4 has been fine-adjusted, the locknut 14 is threadingly engaged with the bolt 12 via threads 56 and 36 whereby the member 4 is clamped between the flange 54 of the locknut 14 and the flange 32 of the bolt 12. The annular projection 58 extending axially from the flange 54 of the locknut 14 engages into the hole of the member 4. The member 4 being in its fine-adjusted axial position is now fixedly connected to the nut 10 and fixedly connected to the member 2 via the nut 10. As a result manufacturing and assembling tolerances between the member 4 (holding section of the backlight) and the other vehicle body portions (not shown) have now been compensated for due to fine-adjustment of bolt 12.

We claim:

1. A threaded joining assembly for joining a first member and a second member, said thread joining assembly comprising:
    a nut adapted to be fixed within a hole of said first member and comprising a sleeve-shaped body, said sleeve-shaped body having a bore comprising a threaded bore portion and a smooth bore portion, and
    a bolt comprising first threads threadingly engaging said threaded bore portion of said nut, a fastening portion connected to said second member, and a sealing portion provided at an axial end of said bolt, said sealing portion comprising at least one circumferentially extending sealing rib dimensioned with respect to said smooth bore portion of said nut such that said sealing rib when said bolt is adjusted relative to said nut, engages said smooth bore portion of said nut in sealed and self-locking relationship,
    said fastening portion of said bolt comprising a flange engaging said second member and second threads threadingly engaging a locknut such that the position of said second member with respect to said first member may be fine-adjusted by said bolt and may be fixed by clamping said second member between said flange of said bolt and said locknut.

2. The threaded joining assembly of claim 1 wherein said sealing portion of said bolt comprises more than three sealing ribs.

3. The threaded joining assembly of claim 1 wherein said first threads of said bolt are disposed between said sealing portion and said flange.

4. The threaded joining assembly of claim 1 wherein said second threads of said bolt are disposed on a side of said flange remote from said first threads.

5. The threaded joining assembly of claim 1 wherein said second threads are provided on an axial end of said bolt.

6. The threaded joining assembly of claim 5 wherein said bolt has a drive formation at its axial end provided with said second threads.

7. The threaded joining assembly of claim 1 wherein said nut is a blind rivet nut.

8. The threaded joining assembly of claim 1 wherein said nut has an annular projection engaging said first member and said smooth bore portion of said nut is provided at an axial end of said nut remote from said annular projection.

9. The threaded joining assembly of claim 1 wherein said second member is a holding section of a vehicle backlight.

10. A threaded joining assembly for joining a first member and a second member, said thread joining assembly comprising:
    a nut adapted to be fixed within a hole of said first member and comprising a sleeve-shaped body, said sleeve-shaped body having a bore comprising a threaded bore portion and a smooth bore portion, and
    a bolt comprising first threads threadingly engaging said threaded bore portion of said nut, a fastening portion connected to said second member, and a sealing portion comprising at least one circumferentially extending sealing rib dimensioned with respect to said smooth bore portion of said nut such that said sealing rib when said bolt is adjusted relative to said nut, engages said smooth bore portion of said nut in sealed and self-locking relationship,
    said fastening portion of said bolt comprising a flange engaging said second member and second threads threadingly engaging a locknut such that the position of said second member with respect to said first member may be fine-adjusted by said bolt and may be fixed by clamping said second member between said flange of said bolt and said locknut, said first threads of said bolt being disposed between said sealing portion and said flange.

11. The threaded joining assembly of claim 10 wherein said sealing portion of said bolt comprises more than three sealing ribs.

12. The threaded joining assembly of claim 10 wherein said second threads of said bolt are disposed on a side of said flange remote from said first threads.

13. The threaded joining assembly of claim 10 wherein said second threads are provided on an axial end of said bolt.

14. The threaded joining assembly of claim 13 wherein said bolt has a drive formation at its axial end provided with said second threads.

15. The threaded joining assembly of claim 10 wherein said nut has an annular projection engaging said first member and said smooth bore portion of said nut is provided at an axial end of said nut remote from said annular projection.

16. The threaded joining assembly of claim 10 wherein said second member is a holding section of a vehicle backlight.

* * * * *

UNITED STATES PATENT AND TRADEMARK OFFICE
CERTIFICATE OF CORRECTION

PATENT NO. : 7,241,097 B2
APPLICATION NO. : 11/301293
DATED : July 10, 2007
INVENTOR(S) : Hans-Joachim Dembowsky et al.

It is certified that error appears in the above-identified patent and that said Letters Patent is hereby corrected as shown below:

Title Page
Item [57] Abstract:

Line 6 "treaded" should be --threaded--.

Signed and Sealed this

Fourth Day of September, 2007

JON W. DUDAS
*Director of the United States Patent and Trademark Office*